(12) United States Patent
Herichkoff

(10) Patent No.: US 11,957,078 B1
(45) Date of Patent: Apr. 16, 2024

(54) SELF UNLOADING HARVEST CART

(71) Applicant: Mark F. Herichkoff, Elrosa, MN (US)

(72) Inventor: Mark F. Herichkoff, Elrosa, MN (US)

( * ) Notice: Subject to any disclaimer, the term of this patent is extended or adjusted under 35 U.S.C. 154(b) by 0 days.

(21) Appl. No.: 17/714,839

(22) Filed: Apr. 6, 2022

Related U.S. Application Data

(60) Provisional application No. 63/172,646, filed on Apr. 8, 2021.

(51) Int. Cl.
*A01D 90/10* (2006.01)
*B60P 1/16* (2006.01)
*B60P 1/38* (2006.01)

(52) U.S. Cl.
CPC .............. *A01D 90/10* (2013.01); *B60P 1/16* (2013.01); *B60P 1/165* (2013.01); *B60P 1/38* (2013.01)

(58) Field of Classification Search
CPC ... A01D 90/10; B60P 1/04; B60P 1/16; B60P 1/165; B60P 1/36; B60P 1/38
USPC ................................ 414/470, 489, 505, 528
See application file for complete search history.

(56) References Cited

U.S. PATENT DOCUMENTS

| | | |
|---|---|---|
| 709,723 A | 9/1902 | Ray |
| 1,515,329 A | 11/1924 | Barkmann et al. |
| 1,582,783 A | 4/1926 | Psenka |
| 1,704,841 A | 3/1929 | Sacerdote |
| 1,928,859 A | 10/1933 | Kutscha |
| 2,534,558 A | 12/1950 | Ottenbacher |
| 2,655,274 A | 10/1953 | Lowe et al. |
| 2,668,629 A | 2/1954 | Dahlman |
| 2,694,499 A | 11/1954 | Mohrlang et al. |
| 2,828,028 A | 3/1958 | Sullenbarger et al. |
| 2,870,923 A | 1/1959 | Jewell, Jr. |
| 3,010,727 A | 11/1961 | Swenson et al. |
| 3,049,251 A | 8/1962 | Glew |

(Continued)

FOREIGN PATENT DOCUMENTS

| | | | |
|---|---|---|---|
| EP | 3132669 A1 * | 2/2017 | ............. A01D 90/10 |
| FR | 2470025 A1 | 5/1981 | |

OTHER PUBLICATIONS

Sugar Beet Harvesting Equipment, Amity Technology, Oct. 2019, 28 pgs, https://www.amitytech.com/sugar-beet-equipment/sugar-beet-cart/Amity_2019-Sugar-Beet-Harvest-Equipment_LoRes.pdf.

(Continued)

*Primary Examiner* — James Keenan
(74) *Attorney, Agent, or Firm* — Albert W. Watkins

(57) ABSTRACT

A self unloading harvest cart transfers agricultural products from a harvester to an over-the-road vehicle. A tilting bin within the cart has a base defining four edges, and first, second and third sidewalls each rise from the first, second, and third base edges, respectively. The bin has a generally open face above the fourth base edge. A bin actuator rotates the tilting bin relative to an undercarriage about a first pivotal coupling. A conveyor sidewall encloses the tilting bin adjacent the base fourth edge, and has a conveyor that conveys agricultural product from within the tilting bin to the over-the-road vehicle. A conveyor sidewall actuator rotates the conveyor sidewall relative to the undercarriage about a second pivotal coupling. The conveyor sidewall is rotated away from agricultural product when or just prior to starting the conveyor, to reduce conveyor sidewall starting resistance and reduce the conveyor sidewall initial load.

18 Claims, 3 Drawing Sheets

(56) References Cited

U.S. PATENT DOCUMENTS

| | | |
|---|---|---|
| 3,348,714 A | 10/1967 | Ash |
| 3,498,486 A | 3/1970 | Freeman, Jr. |
| 3,648,859 A | 3/1972 | Johnson |
| 3,700,283 A * | 10/1972 | Birdsall .................... B60P 1/04 |
| | | 298/7 |
| 4,072,242 A | 2/1978 | Cook |
| 4,373,856 A * | 2/1983 | Taylor .................... B60F 1/043 |
| | | 414/470 |
| 4,493,601 A | 1/1985 | Hill et al. |
| 4,494,904 A | 1/1985 | Hill et al. |
| 5,013,207 A | 5/1991 | Baker et al. |
| 5,108,249 A | 4/1992 | Kinzenbaw et al. |
| 5,338,140 A | 8/1994 | Ekdahl et al. |
| 5,380,142 A | 1/1995 | Hornung et al. |
| 5,826,947 A | 10/1998 | Hornung et al. |
| 5,888,044 A | 3/1999 | Baskerville |
| 6,814,532 B1 | 11/2004 | Thompson et al. |
| 7,322,460 B2 * | 1/2008 | Covington ............. A01D 90/10 |
| | | 198/300 |
| 7,988,403 B2 | 8/2011 | Ricketts |
| 9,433,145 B2 * | 9/2016 | Kalverkamp .......... A01D 90/10 |
| 10,542,677 B1 * | 1/2020 | Kringstad ............. A01D 90/10 |
| 10,682,940 B2 | 6/2020 | Karg |
| 2005/0217506 A1 * | 10/2005 | Meeks .................. A01D 90/10 |
| | | 100/88 |
| 2009/0010743 A1 | 1/2009 | Wilz |
| 2020/0262325 A1 | 8/2020 | Karg |

OTHER PUBLICATIONS

Operating Manual, 2020 Beet Cart, Amity Technology, 43 Pgs, https://www.amitytech.com/sugar-beet-equipment/sugar-beet-cart/Amity_311208-OM-BC.pdf.

* cited by examiner

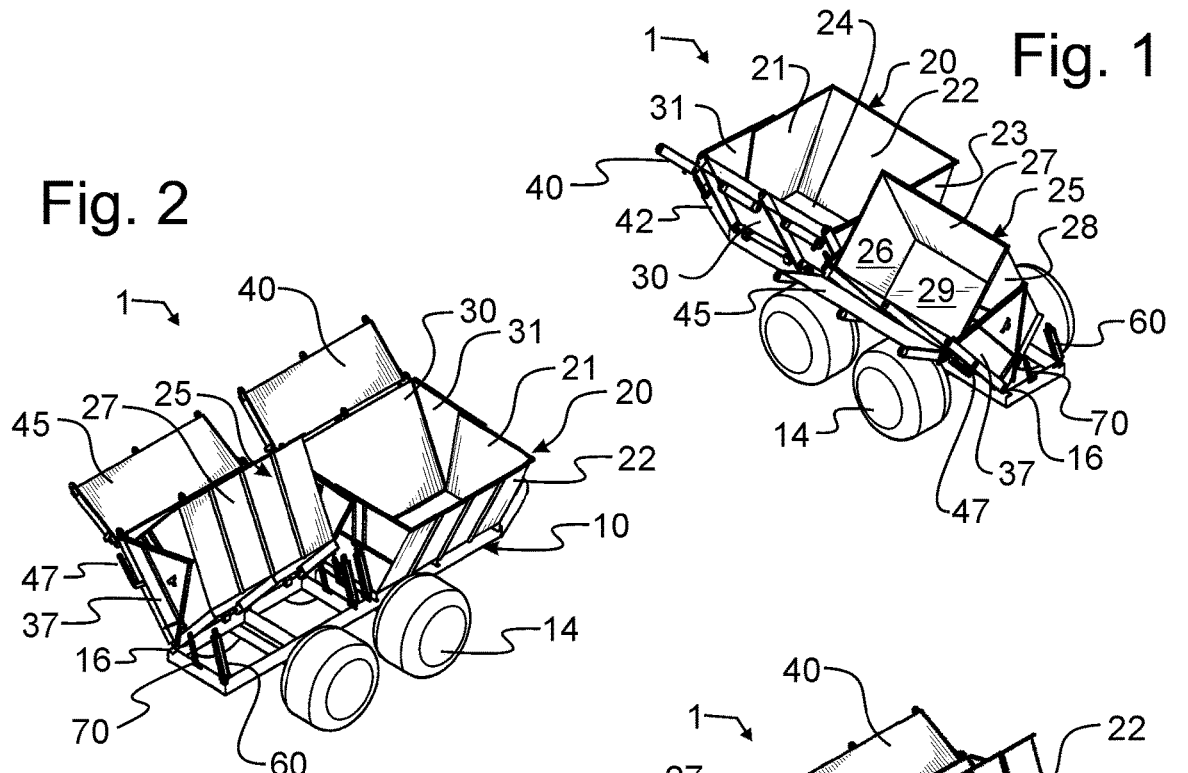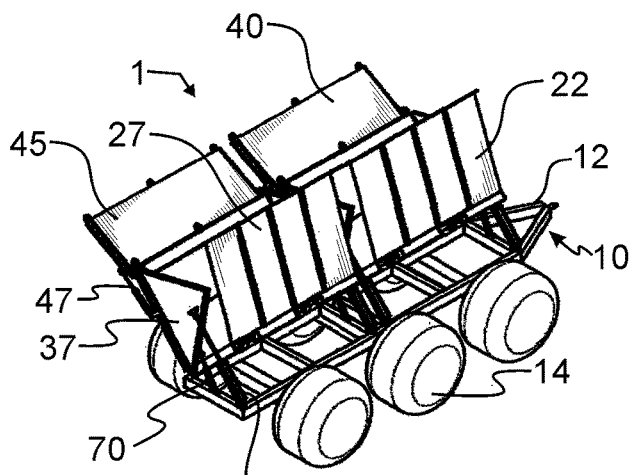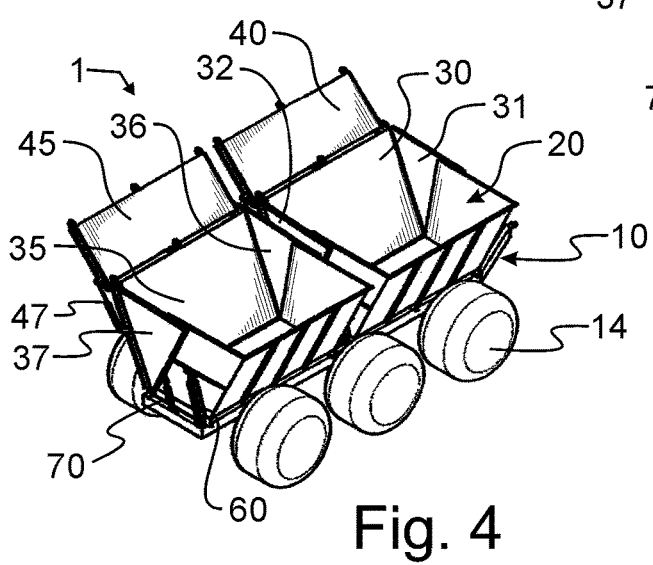

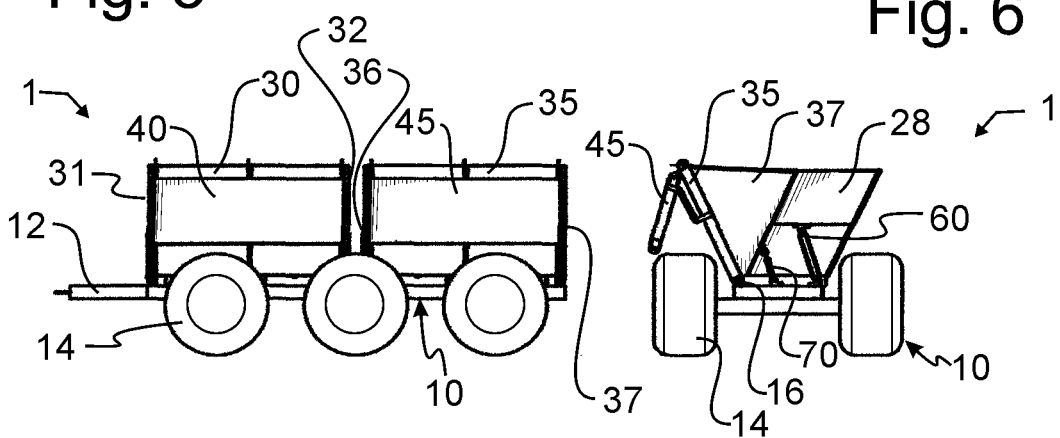
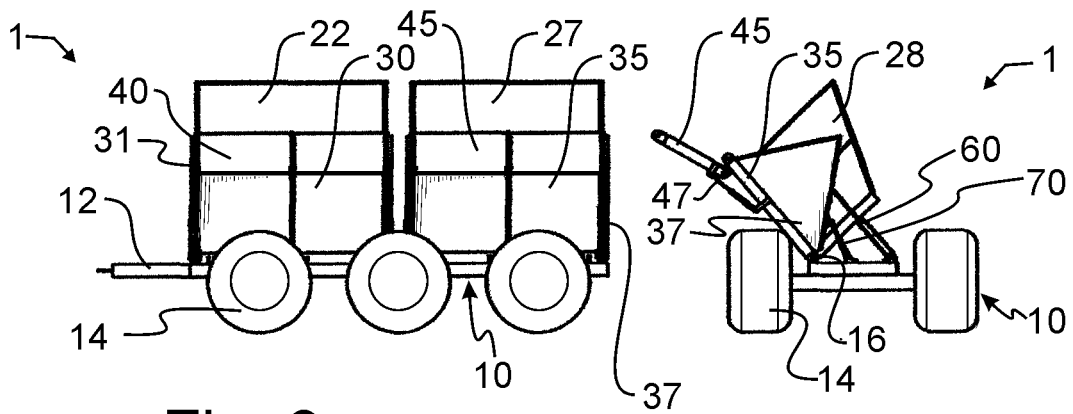

SELF UNLOADING HARVEST CART

CROSS REFERENCE TO RELATED APPLICATIONS

The present application claims the benefit of U.S. provisional patent application 63/172,646 filed Apr. 8, 2021 of like title and inventorship, the teachings and entire contents which are incorporated herein by reference.

BACKGROUND OF THE INVENTION

1. Field of the Invention

The present invention pertains generally to agriculture. In one particular manifestation, the present invention pertains to a harvest cart used to temporarily receive and store harvested agricultural products, and subsequently rapidly discharge the harvested agricultural products from the cart into another receptacle. Exemplary agricultural products to which the present invention pertains, though not limiting the present invention in any way to just these products, may include grains, root crops, beans, seed crops, silage, hay, crop residue such as stalks or cobs, and many other agricultural products.

2. Description of the Related Art

For efficiency in food production, modern agriculture relies on multiple large agricultural vehicles that can rapidly harvest and transport extremely large quantities of agricultural products. This allows a single person to do same work that would have required hundreds or even thousands of manual laborers.

While for many years these large agricultural vehicles traveled freely between public roadways and agricultural fields, this led to significant mud and debris being dropped onto the roadways, particularly at the field exit points. Large agricultural vehicles are most commonly equipped with special tires or tracks that have very aggressive tread patterns designed to provide good traction even in very slippery or soft fields. These tread patterns leave much space between adjacent treads, and can accumulate large clumps of soil or debris.

As may be appreciated, large chunks of debris can be unsafe for passenger vehicles, particularly on high speed highways or in poor weather conditions. As a result, there have been a number of safety concerns that have led to local and regional ordinances and statutes enacted that prohibit agricultural equipment from depositing accumulations of such mud and debris onto the roadways. Large agricultural vehicles are now operated primarily within the fields, and only moved across the roadways infrequently.

One common solution has been to off-load from a large agricultural vehicle to a large over-the-road or other types of longer haul transport vehicle. Many farms have driven these large over-the-road vehicles along side the large agricultural vehicle, allowing a continuous or nearly continuous transfer from the large agricultural vehicle to the large over-the-road vehicle. When one over-the-road vehicle is filled, it will be driven off the field and another will be driven along side the large agricultural vehicle.

As may be appreciated, the over-the-road vehicles are normally designed with narrower tires and tighter tread patterns than are found on the field vehicles. This reduces the amount of mud and debris deposited when the over-the-road vehicles exit the field and return to the roadway.

Unfortunately, depending upon field conditions these over-the-road or other types of longer haul transport vehicles may have trouble traversing the field. Over-the-road vehicles can easily get stuck when the field is very slippery or soft, which can be very common when the ground is wet. In such cases, a harvesting operation can be seriously delayed while the over-the-road vehicle is pulled out of the mud. In addition, though much less common, irregularities in the field can undesirably result in damage to the over-the-road vehicle, which is designed to operate on relatively smooth and hard surfaces. Even when the over-the-road vehicle is able to traverse the field successfully, the large weight, narrower tires, and different tire spacing can also undesirably damage the field.

Due to the regulations prohibiting dirt from being carried onto the roads, and the undesirability of needing to traverse the fields with roadway vehicles, many farms have segregated field vehicles and over-the-road or other types of longer haul transport vehicles. Since the over-the-road or other types of longer haul transport vehicles, such as semi-truck and trailer combinations, are designed to traverse paved areas, these over-the-road vehicles are parked on special driveways, pads or other structures that are relatively smooth and solid surfaces resembling and often connecting to a roadway. Even if not paved, these driveways are desirably firm and solid even when a field may be wet. As a result, these driveways provide good traction and reduce the amount of debris picked up in the tires and running gear of the over-the-road vehicle and reduce the chance of harm to either of the vehicle and the field.

Since the large agricultural vehicle and large over-the-road vehicles are primarily separate from each other, the agricultural vehicles have to unload the agricultural product onto over-the-road vehicles. While the agricultural vehicles are unloading, they are not being used for their primary purpose. Instead, this unloading is time that undesirably adds to the total harvesting or other agricultural processes. Therefore, in an ideal process the agricultural product is moved as fast as possible to reduce this time away from the harvesting process. In addition, this offloading from the large agricultural vehicle to the large over-the-road vehicle will occur with minimal or no damage or loss of agricultural product.

To meet these challenges, some artisans have designed harvest carts that are towed behind or along side an agricultural harvester. The harvest carts are filled in a manner similar to the way an adjacent over-the-road vehicle is filled. However, since the cart is being towed by the agricultural harvester, the harvester must then be driven to an over-the-road vehicle, with the harvest cart adjacent the over-the-road vehicle, to unload the cart.

Many prior art carts or vehicles provide apparatus to self-unload, such as conveyors or augers in the bottom of the cart, and sides or bottoms of the cart that can be moved to facilitate transport of the contents to the conveyor. Exemplary U.S. patents, the teachings which are incorporated herein by reference, include: U.S. Pat. No. 1,928,859 by Kutscha, entitled "Convertible truck body"; U.S. Pat. No. 2,668,629 by Dahlman, entitled "Material handling and unloading device for vehicles"; U.S. Pat. No. 2,694,499 by Mohrlang et al, entitled "Feed distributor vehicle"; U.S. Pat. No. 2,828,028 by Sullenbarger et al, entitled "Convertible farm wagon"; U.S. Pat. No. 2,870,923 by Jewell, Jr., entitled "Convertible dump body"; U.S. Pat. No. 3,049,251 by Glew, entitled "Commercial carrier bulk unloading device"; and U.S. Pat. No. 3,648,859 by Johnson, entitled "Compound movable-sided truck hopper".

Other carts provide a combination tipping box and conveyor. Exemplary U.S. and Foreign patents and published applications, the teachings which are incorporated herein by reference, include: U.S. Pat. No. 1,515,329 by Barkmann et al, entitled "Truck"; U.S. Pat. No. 2,534,558 by Ottenbacher, entitled "Self-unloading vehicle"; U.S. Pat. No. 3,010,727 by Swenson et al, entitled "Dump truck with conveyor and spreader"; U.S. Pat. No. 4,493,601 by Hill et al, entitled "High capacity, self-unloading forage hopper"; and U.S. Pat. No. 4,494,904 by Hill et al, entitled "Self-unloading on-the-go forage hopper".

Yet other carts provide conveyors that are located in or adjacent to the side or end walls that raise the agricultural product from the cart up and out therefrom. Exemplary U.S. and Foreign patents and published applications and publications, the teachings which are incorporated herein by reference, include: U.S. Pat. No. 709,723 by Ray, entitled "Chute wagon"; U.S. Pat. No. 1,582,783 by Psenka, entitled "Conveyer truck"; U.S. Pat. No. 1,704,841 by Sacerdote, entitled "Loading attachment for trucks"; U.S. Pat. No. 2,655,274 by Lowe et al, entitled "Crop harvesting equipment"; U.S. Pat. No. 4,072,242 by Cook, entitled "Unloading tailgate for self-unloading forage wagon"; U.S. Pat. No. 5,338,140 by Ekdahl et al, entitled "Boll buggy"; U.S. Pat. No. 7,988,403 by Ricketts, entitled "Bulk materials cart having dual unload capability"; FR2470025 by Grudet, entitled "Container trailer for motor vehicle—has triangular hopper discharged by powered conveyor or gravity via door"; and Amity's sugar beet cart as described at https://www.amitytech.com/sugar-beet-equipment/sugar-beet-cart/, and in two brochures, Amity_2019-Sugar-Beet-Harvest-Equipment_LoRes.pdf and Amity_311208-OM-BC.pdf provided with this filing.

While such carts have heretofore provided much utility for diverse purposes, they fail to address the challenges faced by a modern farm. The challenge with unloading a modern harvest cart is the need to lift the agricultural product over the very high side wall of the over-the-road vehicle. These side walls are necessarily quite high to hold more product, to reach the road limit capacities and thereby allow a single truck to haul the maximum amount of agricultural product. Unfortunately, these types of carts generally do not reach the elevations necessary to unload over the side wall and into an over-the-road vehicle, others fail to unload quickly, some are very complex and expensive to produce and are necessarily less reliable in the fields, and some of these also fail to provide an adequate way to initiate the conveyor when the cart is filled.

To address these limitations of the prior art, during unloading many modern harvest carts raise the cart bin up into the air higher than the over-the-road vehicle side wall, and then pivot to dump the load from the cart across into the over-the-road vehicle. Exemplary U.S. patents and published applications, the teachings which are incorporated herein by reference, include: U.S. Pat. No. 3,348,714 by Ash, entitled "Tipping-bin trucks or trailers"; U.S. Pat. No. 5,013,207 by Baker et al, entitled "Crop transporter"; U.S. Pat. No. 5,380,142 by Hornung et al, entitled "Drop chute extension for a shuttle dumping transport vehicle for harvested cotton"; U.S. Pat. No. 5,826,947 by Hornung et al, entitled "Fold-out chute extension for a shuttle dumping transport vehicle for harvested cotton"; U.S. Pat. No. 10,682,940 by Karg, entitled "Agricultural dump cart"; and 2020/0262325 by Karg, entitled "Agricultural dump cart". In some of these harvest carts, one or more conveyors are also provided to accelerate the unloading from the cart.

Unfortunately, agricultural products have a limited window in which they can be harvested, and if the ground is unstable during harvest, these types of dumping carts can be very dangerous. When the load is raised to facilitate off-loading, tipping and spilling the content can occur. If the agricultural product is spilled, then the agricultural product can take a very long time to recover from the ground, or, in some instances, will be contaminated and no longer useful. Of great further concern, tipping a loaded cart raised to those heights with many tons of product on board can also be extremely dangerous to personnel and can lead to damage or destruction of expensive equipment.

Additional patents of varying relevance but that still suffer from the limitations already described herein above, the relevant teachings and contents which are incorporated herein by reference, include: U.S. Pat. No. 5,108,249 by Kinzenbaw et al, entitled "Gravity fed, chain conveyer for grain cart"; U.S. Pat. No. 5,888,044 by Baskerville, entitled "Seed cart with loading/unloading conveyor system"; U.S. Pat. No. 6,814,532 by Thompson et al, entitled "Self-unloading, bottom discharge trailer"; and 2009/0010743 by Wilz, entitled "Trailer adapted for use with a stone slinger".

As may be apparent, in spite of the enormous advancements and substantial research and development that has been conducted, there still remains a need for a safe to operate, easier to manufacture, and highly reliable harvest cart that still off-loads into an over-the-road vehicle quickly and efficiently.

In addition to the foregoing patents, Webster's New Universal Unabridged Dictionary, Second Edition copyright 1983, is incorporated herein by reference in entirety for the definitions of words and terms used herein.

SUMMARY OF THE INVENTION

In a first manifestation, the invention is a self unloading harvest cart. The cart has an undercarriage. Running gear support the undercarriage above and separated from the ground, and are configured to reduce drag with the ground during transport. A tilting bin has a base defining first, second, third and fourth edges, and first, second and third sidewalls each rising from the first, second, and third base edges, respectively. The bin has a generally open face above the fourth base edge. A first pivotal coupling is rigidly affixed with each of the undercarriage and the tilting three-sided bin. The first pivotal coupling defines an axis of rotation of the tilting three-sided bin relative to the undercarriage. A bin actuator has a first end and a second end distal to the first end. The bin actuator first end is coupled to the tilting three-sided bin, and the bin actuator second end is coupled to the undercarriage. The bin actuator is configured to rotate the tilting bin relative to the undercarriage about the tilting bin axis of rotation. A conveyor sidewall encloses the tilting bin adjacent the base fourth edge. The conveyor sidewall has a conveyor configured to convey an agricultural product from within the tilting bin to an exterior thereof. A second pivotal coupling is rigidly affixed with each of the undercarriage and the conveyor sidewall. The second pivotal coupling defines an axis of rotation of the conveyor sidewall relative to the undercarriage. A conveyor sidewall actuator has a first end and a second end distal to the first end. The conveyor sidewall actuator first end is coupled to the conveyor sidewall and the conveyor sidewall actuator second end is coupled to the undercarriage. The conveyor sidewall actuator is configured to rotate the conveyor sidewall relative to the undercarriage about the conveyor sidewall axis of rotation.

In a second manifestation, the invention is a combination over-the-road vehicle and a self unloading harvest cart. The over-the-road vehicle comprises a motive drive configured for transport on public roadways; and an agricultural product bin moved by the motive drive and configured to receive and contain an agricultural product during public roadway transport. The cart has an undercarriage. Running gear support the undercarriage above and separated from the ground, and are configured to reduce drag with the ground during transport. A tilting bin has a base defining first, second, third and fourth edges, and first, second and third sidewalls each rising from the first, second, and third base edges, respectively. The bin has a generally open face above the fourth base edge. A first pivotal coupling is rigidly affixed with each of the undercarriage and the tilting three-sided bin. The first pivotal coupling defines an axis of rotation of the tilting three-sided bin relative to the undercarriage. A bin actuator has a first end and a second end distal to the first end. The bin actuator first end is coupled to the tilting three-sided bin, and the bin actuator second end is coupled to the undercarriage. The bin actuator is configured to rotate the tilting bin relative to the undercarriage about the tilting bin axis of rotation. A conveyor sidewall encloses the tilting bin adjacent the base fourth edge. The conveyor sidewall has a conveyor configured to convey an agricultural product from within the tilting bin to the over-the-road vehicle agricultural product bin. A second pivotal coupling is rigidly affixed with each of the undercarriage and the conveyor sidewall. The second pivotal coupling defines an axis of rotation of the conveyor sidewall relative to the undercarriage. A conveyor sidewall actuator has a first end and a second end distal to the first end. The conveyor sidewall actuator first end is coupled to the conveyor sidewall and the conveyor sidewall actuator second end is coupled to the undercarriage. The conveyor sidewall actuator is configured to rotate the conveyor sidewall relative to the undercarriage about the conveyor sidewall axis of rotation.

In a third manifestation, the invention is a method of removing an agricultural product from a field. In accord with the method, a self unloading harvest cart is moved adjacent to an agricultural product harvester. The agricultural product is transferred from the agricultural product harvester to the self unloading harvest cart. The self unloading harvest cart is subsequently positioned adjacent to an over-the-road vehicle. An upper conveyor is extended from a lower conveyor sidewall over an over-the-road vehicle cargo area. The lower conveyor sidewall is rotated to a less vertical orientation and in a direction of rotation away from the agricultural product. The lower conveyor sidewall and the upper conveyor are driven responsive to the rotating step to reduce both of a lower conveyor sidewall starting resistance and lower conveyor sidewall initial load, and to convey the agricultural product from within the self unloading harvest cart across the lower conveyor sidewall and the upper conveyor to the over-the-road vehicle cargo area and thereby unload the self unloading harvest cart into the over-the-road vehicle cargo area. The agricultural product is transported in the over-the-road vehicle cargo area from the field onto a roadway.

OBJECTS OF THE INVENTION

Exemplary embodiments of the present invention solve inadequacies of the prior art by providing a self unloading harvest cart with at least one, and preferably two or more bins that each have one side wall that uses one or more and preferably two conveyor steps. By using conveyors, the bins are unloaded without having to be lifted high into the air. The side wall conveyors fold out as the conveyor is started, reducing the starting resistance and initial load on the conveyor. The present cart can unload the bulk of the bin in less time than a prior art lift and dump cart. Rather than hazardously lifting the entire load before dumping, in accord with the teachings of the present invention the operator activates the conveyors and the load begins transferring while keeping the cart in a stable position adjacent the cart undercarriage and wheel set.

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

A first object of the invention is to provide a self unloading harvest cart that unloads into a high-sidewall over-the-road vehicle both quickly and safely, and which is similarly beneficial for unloading into lower-sidewall vehicles and onto the ground. A second object of the invention is to keep the bulk of the load within the harvest cart low and near to the running gear even during unloading, thereby increasing stability and versatility. Another object of the present invention is to minimize weight, which in turn reduces field compaction and horsepower required to pull the cart through fields. A further object of the invention is to decrease complexity and manufacturing cost while increasing reliability. Yet another object of the present invention is to reduce the starting resistance and initial load upon a conveyor sidewall used to transport an agricultural crop from within the harvest cart.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which:

FIGS. 1 and 2 illustrate a preferred embodiment self unloading harvest cart designed in accord with the teachings of the present invention from an upper left rear projected view and an upper right rear projected view, respectively, each with the rear bin tilted to an unloading position.

FIG. 3 illustrates the preferred embodiment self unloading harvest cart of FIGS. 1 and 2 from an upper right rear projected view, with an additional pair of wheels and with both bins tilted.

FIG. 4 illustrates the preferred embodiment self unloading harvest cart of FIG. 3 from an upper right rear projected view, with both bins down.

FIGS. 5 and 6 illustrate the preferred embodiment self unloading harvest cart of FIG. 3 from left side and rear views, respectively, with both bins and the adjustable upper conveyor down.

FIGS. 7 and 8 illustrate the preferred embodiment self unloading harvest cart of FIG. 3 from left side and rear views, respectively, with both bins down, the adjustable upper conveyors raised, and with the conveyor sidewalls tilted out.

FIGS. 9 and 10 illustrate the preferred embodiment self unloading harvest cart of FIG. 3 from left side and rear views, respectively, with both bins tilted and the adjustable upper conveyor raised.

DESCRIPTION OF THE PREFERRED EMBODIMENT

Figure 11:
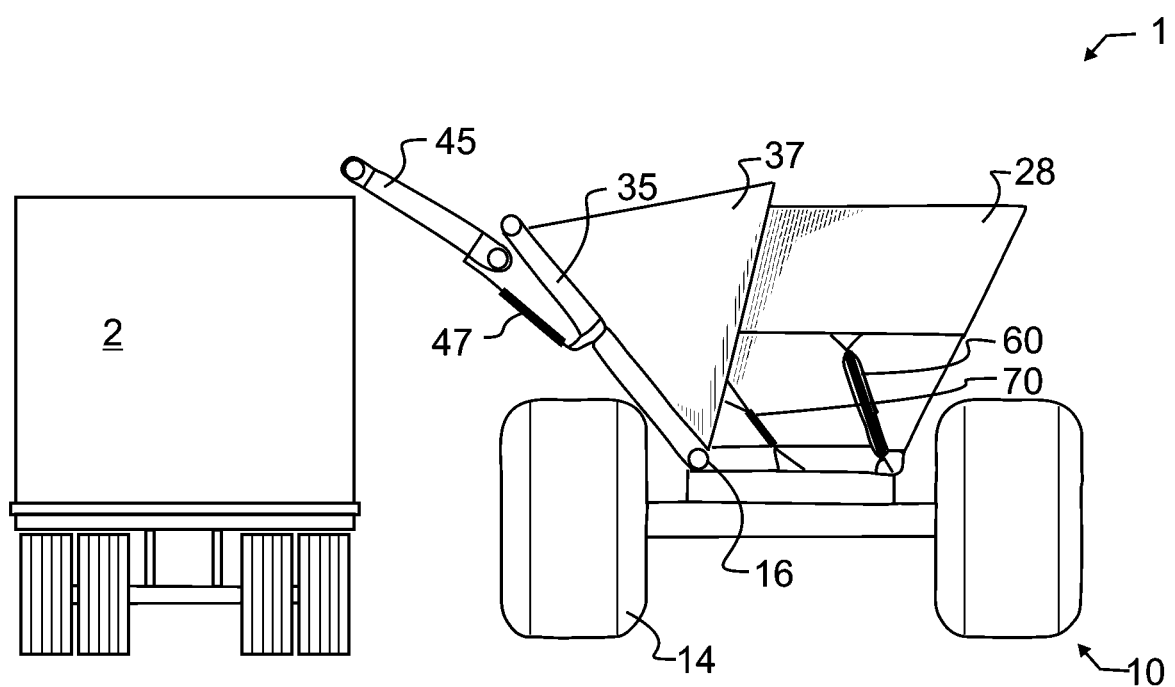
FIG. 11 illustrates the preferred embodiment self unloading harvest cart of FIG. 8 in further combination with an over-the-road vehicle from a rear view.

As manifested in a preferred embodiment of the invention illustrated in FIGS. 1-2, a self unloading harvest cart 1 is comprised of an undercarriage 10, at least one tilting three-sided bin 20, a conveyor sidewall 30, and an adjustable upper conveyor 40. Three-sided bin 20 and conveyor sidewall 30 are configured to define an open-top adjustable volume receptacle that is supported on undercarriage 10.

Undercarriage 10 supports running gear such as the exemplary four wheels 14 illustrated in FIGS. 1-2. The running gear supports undercarriage 10 above and separated from the ground and is configured to reduce drag with the ground during transport. While four wheels 14 are illustrated in FIGS. 1-2, in alternative embodiments, any number or geometry of wheels are provided, and the type of tires include but are not limited to standard field tires, large balloon tires, or dual tires. In other alternative embodiments, tracks or other suitable runners are provided. The selection of numbers and types of wheels or tracks will depend upon field conditions and how much compaction and stability is desirable when fully loaded, as will be determined by those reasonably skilled in the art. For exemplary and non-limiting purpose, FIGS. 3-10 illustrate six wheels 14.

Any suitable apparatus will be provided to couple undercarriage 10 to a towing vehicle, such as the exemplary trailer tongue and hitch 12 illustrated, a fifth wheel connection, a Clovis hitch, a ball hitch, or a three point connection. In many cases, the towing vehicle will be a tractor or an agricultural harvester, though any suitable towing vehicle may be used.

In preferred embodiment self unloading harvest cart 1, undercarriage 10 additionally supports three-sided bin 20. Bin 20 is a three-sided bin, having vertical side walls 21, 23, sloped side wall 22, and bottom 24. The geometry of bottom 24 is a rectangular and substantially planar sheet or plate, with each of the three side walls 21-23 rising vertically from first, second, and third bottom edges. While there is no structure illustrated above the fourth edge of bottom 24, it will be understood that railings or other framework or the like may be provided above this fourth edge of bottom 24, but this side of bin 20 above the fourth edge of bottom 24 will most preferably remain substantially open to the flow of agricultural product held within bin 20.

In some alternative embodiments, bottom 24 is a quadrilateral, and in yet other alternative embodiments bottom 24 is a pentagon or other multi-sided geometry. Most preferably, and as will be apparent from the Figures and description herein below, the edges where side walls 21, 23 couple to bottom 24 are parallel to each other and perpendicular to the fourth edge of bottom 24 that defines the open side of bin 20. In some alternative embodiments, bottom 24 is further provided with flow directing features such as a groove or trough, and so is somewhat less planar or sheet-like.

A suitable pintle 16 such as a rod or hinge apparatus is provided to couple bin 20 to undercarriage 10, while allowing bin 20 to tilt or pivot relative to the undercarriage about a bin axis of rotation defined by pintle 16. In the preferred embodiment illustrated, the axis of rotation of bin 20 relative to undercarriage 10 is parallel with the fourth base edge. While not essential to the present invention, by aligning the axis of rotation of bin 20 relative to undercarriage 10 to be parallel with the fourth base edge helps to distribute agricultural product evenly along the open side of bin 20, in turn more evenly across conveyor sidewall 30 as will be described herein below. A bin actuator 60, which may be a pneumatic, hydraulic, electric, or other suitable actuator or cylinder, provides the motive force necessary and suitable to rotate bin 20 about pintle 16.

The fourth wall necessary to retain agricultural products within bin 20 is defined by conveyor sidewall 30. Conveyor sidewall 30 is also most preferably configured to tilt relative to undercarriage 10, as illustrated also about pintle 16, though in alternative embodiments through separate pintle or other structure as will be apparent to those skilled in the art. Conveyor sidewall actuator 70, which may be a pneumatic, hydraulic, electric, or other suitable actuator or cylinder, provides the motive force necessary and suitable to rotate conveyor sidewall 30 about pintle 16.

As illustrated, conveyor sidewall 30 is parallel to the conveyor sidewall axis of rotation defined by pintle 16. However, in some alternative embodiments, conveyor sidewall 30 is offset from parallel to the conveyor sidewall axis of rotation defined by pintle 16. In such alternative embodiments, agricultural product being lifted by conveyor sidewall 30 will be shifted or biased to one edge or the other, accordingly.

Since in preferred embodiment self unloading harvest cart 1 the conveyor sidewall 30 is configured to pivot independently of bin 20, a pair of articulated sidewalls 31, 32 that are rigidly affixed with conveyor sidewall 30 on opposite sides thereof are most preferable. Sidewalls 31, 32 extend from conveyor sidewall 30 in a plane transverse to the rotary axis defined by pintle 16, and are configured in combination with sidewall 30 to ensure that bin 20 retains agricultural product therein. In some embodiments articulated sidewalls 31, 32 will simply slide in contact with vertical side walls 21, 23, respectively. For larger agricultural products such as most root crops, sugar beets being one such agricultural product, the size of the individual agricultural product will be far greater than reasonable tolerances between articulated sidewalls 31, 32 and vertical side walls 21, 23. In other embodiments, vertical side walls 21, 23 may further include one or more ribs or corrugations that provide limited but sealing contact with the associated one of articulated sidewalls 31, 32, though even adjacent planar surfaces will be sufficient for some applications. In yet other embodiments, particularly those designed for small or challenging agricultural products, various seals may be provided which may include such known apparatus as elastomeric or low-friction ribs, metal sweeps or scrapers, or any other suitable sliding seals.

Adjustable upper conveyor 40 is controlled by upper conveyor actuator 42 to rotate about a longitudinal axis parallel to pintle 16, but adjacent to the upper end of conveyor sidewall 30. Upper conveyor actuator 42 may be a pneumatic, hydraulic, electric, or other suitable actuator or cylinder. One or even several sequential adjustable upper conveyor(s) 40 are optional, but preferred to enable preferred embodiment self unloading harvest cart 1 to maintain a reasonable height and width during loading and transport, while still enabling the conveyances to lift retained agricultural product sufficiently to reach over the side walls of over-the-road or long haul vehicles during off-loading. In addition, in uneven terrain such as when off-loading from a ditch or waterway, additional height may be necessary or required. As is apparent, where additional height is not required or desired the adjustable upper conveyor(s) 40 may be only slightly rotated, effectively lowering the agricultural product below the peak height reached by conveyor sidewall 30, while also moving the agricultural product farther away from wheels 14 and undercarriage 10.

In some alternative embodiments, a weight or load sensor is provided to detect the weight of agricultural product held within bin 20. This load sensor may comprise any suitable type of sensor, for exemplary and non-limiting purpose including an ultrasonic or optical detector which will detect either a void or extent of presence of agricultural product, a weight sensor, a pressure sensor, a strain gauge, or other suitable sensor. In such embodiments, suitable communications for exemplary and non-limiting purpose including a radio are preferably provided to either on-demand, intermittently, or continuously communicate the weight of agricultural product held within bin 20 to a vehicle operator or other interested party.

In some alternative embodiments, a portion of the top of one or more of side walls 21-23 is moveable relative to the remainder of the side wall, thereby configured to open and drop down outside of the bin interior. In such alternative embodiments, this feature allows the side(s) so equipped to receive agricultural product from a harvester chute, conveyor, or other suitable apparatus at an elevation lower than the balance of the top edge of bin 20. The mechanism of opening is not critical to the present invention, and so for exemplary and non-limiting purpose will include: hinges that allow pivoting a portion of the side wall, thereby allowing it to drop and hang downward from the side wall; a slide that allows the portion to slide down and remain parallel to the side wall; removable fasteners allowing the portion to be full removed from the side wall; and other suitable apparatus.

While only one bin 20 is required, two or more bins may be used. In preferred embodiment self unloading harvest cart 1, a second tilting three-sided bin 25 is included, and has vertical side walls 26, 28, sloped side wall 27, and bottom 29 that are similar to and function in the same manner as those associated with bin 20. Likewise, conveyor sidewall 35 having articulated sidewalls 36, 37, adjustable upper conveyor 45, and upper conveyor actuator 47 are also provided, again that are similar to and function in the same manner as those associated with bin 20. Where multiple bins such as bins 20, 25 as illustrated are provided, suitable flanges such as rubber extensions or flares may be provided that extend from and outside of the upper rim of one or both of bins 20, 25 and block the slight gap between hoppers. Where two or more bins 20, 25 are provided, each of the bins will preferably be independently actuated and unloaded, such as illustrated in FIGS. 1 and 2, where bin 25 is being tilted for unloading while bin 20 remains level.

The operation of preferred embodiment self unloading harvest cart 1 is best illustrated in FIGS. 5-10, and begins when preferred embodiment self unloading harvest cart 1 is coupled through trailer tongue and hitch 12 to a towing vehicle such as a tractor or an agricultural harvester. While this arrangement is preferred, owing to the lower cost and common availability of tow couplings to many agricultural machines, in some alternative embodiments self unloading harvest cart 1 may be provided with a source of motive power and either an operator seat or cabin, or suitable position sensing to automatically track adjacent to an agricultural machine such as a harvester. In some of these embodiments, trailer tongue and hitch 12 will not be provided.

When in the position illustrated in FIGS. 5 and 6, bins 20, 25 may be filled with agricultural product. Upper conveyor actuator 47 is retracted, so adjustable upper conveyor 45 is folded in and down, generally close to or within the side edges defined by wheels 14.

At some point in time subsequent to the start of filling, a determination will be made that it is time to unload one or both of bins 20, 25. This may be done purely visually by an operator, either directly by line of sight or in some embodiments with camera assistance, or in other embodiments automatically, such as with an optical or other load detector such as a weight or strain gauge detecting that one or both of bins 20, 25 are in need of unloading.

Once a determination is made that it is time to unload one or both of bins 20, 25, the operator or automated guidance system will move preferred embodiment self unloading harvest cart 1 into position adjacent the unloading site. Commonly this will be in a side-by-side and generally longitudinally parallel arrangement with an open-top semi-trailer, though the invention is not limited thereto.

Next, one or both of adjustable upper conveyors 40, 45 are pivoted, raising them to the position illustrated in FIGS. 7 and 8. Similarly, one or both of conveyor sidewalls 30, 35 are tilted outward to a somewhat more horizontal alignment while the conveyor(s) are driven, thereby causing the agricultural product to move up to upper conveyors 40, 45 and off the end thereof into the adjacent over-the-road vehicle. By pivoting conveyor sidewalls 30, 35 counterclockwise in the views of FIGS. 6, 8, and 10, the conveyor sidewalls 30, 35 move away from the retained agricultural product. While in alternative embodiments designed to transport many types of retained agricultural product such motion may not be necessary or required, in preferred embodiment self unloading harvest cart 1 this motion helps to reduce both the starting resistance and initial load on the conveyor sidewalls 30, 35. Most preferably, though again dependent upon the type of retained agricultural product, conveyor sidewalls 30, 35 and adjustable upper conveyors 40, 45 are provided with multiple ribs or other apparatus as is known in the art of conveyors that will hold the agricultural product while being conveyed.

While the order is not critical to the invention, it is generally desirable to raise or rotate one or both of adjustable upper conveyors 40, 45 prior to tilting one or both of the associated conveyor sidewalls 30, 35. This ensures more side clearance to rotate adjustable upper conveyors 40, 45.

As conveyor sidewalls 30, 35 move the retained agricultural product out of bins 20, 25, some of the retained agricultural product may still rest upon the bottoms 24, 29. To completely empty bins 20, 25, bin actuator 60 is extended, causing any remaining retained agricultural product to roll or slide onto conveyor sidewalls 30, 35, and from there to be transported out of preferred embodiment self unloading harvest cart 1.

Some retained agricultural products will not create excessive starting resistance and initial load on conveyor sidewalls 30, 35. In consideration thereof, some alternative embodiments will have fixed or non-tilting conveyor sidewalls 30, 35, and will instead rely solely on the tilting of three-sided bins 20, 25 during unloading of the retained agricultural products.

As should be apparent, in some embodiments the operational sequences are manually controlled, such as through switches that control hydraulic valves. However, in other embodiments such operations are partially or entirely automatically controlled.

Because bins 20, 25 are anchored adjacent undercarriage 10, when loaded and during discharge these bins retain a low center of gravity, and so are substantially more stable than the prior art lifting and dumping carts. As a result, the present invention is much safer and easier to operate. In addition, even when the load is only partially unloaded, bins 20, 25 may be easily and safely lowered to the fill position illustrated in FIGS. 5 and 6. Since less apparatus is required for off-loading, the present invention is also lighter and simpler than the prior art lifting and dumping carts, resulting in less compaction and lower horsepower required to pull the cart through the fields.

As illustrated in FIG. 11, a preferred embodiment self unloading harvest cart 1 such as shown in FIG. 8 is positioned to unload directly into a prior art over-the-road vehicle 2. While this is the most preferred combination, as described herein above, preferred embodiment self unloading harvest cart 1 is also configured to unload to the ground or other desired elevation as well.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

I claim:

1. A self unloading harvest cart, comprising:
   an undercarriage;
   running gear supporting said undercarriage above and separated from the ground and configured to reduce drag with the ground during transport;
   a tilting bin having a base defining first, second, third and fourth edges, and first, second and third sidewalls each rising from said first, second, and third base edges, respectively, said bin having a generally open face above said fourth base edge;
   a first pivotal coupling rigidly affixed with each of said undercarriage and said tilting bin, said first pivotal coupling defining an axis of rotation of said tilting bin relative to said undercarriage;
   a bin actuator having a first end and a second end distal to said first end, said bin actuator first end coupled to said tilting bin and said bin actuator second end coupled to said undercarriage, said bin actuator configured to rotate said tilting bin relative to said undercarriage about said tilting bin axis of rotation;
   a conveyor sidewall enclosing said tilting bin adjacent said base fourth edge, said conveyor sidewall having a conveyor configured to convey an agricultural product from within said tilting bin to an exterior thereof;
   a second pivotal coupling rigidly affixed with each of said undercarriage and said conveyor sidewall, said second pivotal coupling defining an axis of rotation of said conveyor sidewall relative to said undercarriage; and
   a conveyor sidewall actuator having a first end and a second end distal to said first end, said conveyor sidewall actuator first end coupled to said conveyor sidewall and said conveyor sidewall actuator second end coupled to said undercarriage, said conveyor sidewall actuator configured to rotate said conveyor sidewall relative to said undercarriage about said conveyor sidewall axis of rotation away from said agricultural product within said tilting bin when starting said conveyor to thereby reduce a conveyor sidewall starting resistance and conveyor sidewall initial load.

2. The self unloading harvest cart of claim 1, wherein said conveyor sidewall axis of rotation is parallel with said fourth base edge.

3. The self unloading harvest cart of claim 2, wherein said conveyor sidewall further comprises first and second conveyor articulating sidewalls that each define a plane transverse to said conveyor sidewall axis of rotation.

4. The self unloading harvest cart of claim 3, wherein said tilting bin axis of rotation is parallel with said fourth base edge.

5. The self unloading harvest cart of claim 4, wherein said first conveyor articulating sidewall is parallel with and immediately adjacent to said first bin sidewall and configured to prevent consequential escape of said agricultural product from within said tilting bin to an exterior thereof through any spacing therebetween, and said second conveyor articulating sidewall is parallel with and immediately adjacent to said third bin sidewall and configured to prevent consequential escape of said agricultural product from within said tilting bin to an exterior thereof through any spacing therebetween.

6. The self unloading harvest cart of claim 5, wherein said conveyor sidewall generally defines a plane that is parallel to said conveyor sidewall axis of rotation.

7. The self unloading harvest cart of claim 1, wherein said conveyor sidewall further comprises a secondary conveyor that is coupled to said conveyor through a pintle, and has a secondary conveyor actuator configured to pivot said secondary conveyor relative to said conveyor about a secondary conveyor axis of rotation.

8. The self unloading harvest cart of claim 7, wherein said secondary conveyor is configured to receive an agricultural product from said conveyor and in a first position to convey said agricultural product over the side wall of an over-the-road trailer and in a second position to convey said agricultural product to the ground.

9. The self unloading harvest cart of claim 7, wherein said secondary conveyor axis of rotation is parallel to said conveyor sidewall axis of rotation.

10. The self unloading harvest cart of claim 1, further comprising a coupling configured to couple said undercarriage to an agricultural harvester.

11. The self unloading harvest cart of claim 1, wherein said base further comprises a generally rectangular plate.

12. The self unloading harvest cart of claim 1, wherein said first pivotal coupling and said second pivotal coupling each pivot about and thereby share a pin.

13. In combination, an over-the-road vehicle and a self unloading harvest cart,
said over-the-road vehicle comprising:
   a motive drive configured for transport on public roadways; and
   an agricultural product bin moved by said motive drive and configured to receive and contain an agricultural product during said public roadway transport;
said self unloading harvest cart comprising:
   an undercarriage;
   running gear supporting said undercarriage above and separated from the ground and configured to reduce drag with the ground during transport;
   a tilting bin having a base defining first, second, third and fourth edges, and first, second and third sidewalls each rising from said first, second, and third base edges, respectively, said bin having a generally open face above said fourth base edge;
   a first pivotal coupling rigidly affixed with each of said undercarriage and said tilting bin, said first pivotal coupling defining an axis of rotation of said tilting bin relative to said undercarriage;
   a bin actuator having a first end and a second end distal to said first end, said bin actuator first end coupled to said tilting bin and said bin actuator second end coupled to said undercarriage, said bin actuator configured to rotate said tilting bin relative to said undercarriage about said tilting bin axis of rotation;

a conveyor sidewall enclosing said tilting bin adjacent said base fourth edge, said conveyor sidewall having a conveyor configured to convey an agricultural product from within said tilting bin to said over-the-road vehicle agricultural product bin;

a second pivotal coupling rigidly affixed with each of said undercarriage and said conveyor sidewall, said second pivotal coupling defining an axis of rotation of said conveyor sidewall relative to said undercarriage; and a conveyor sidewall actuator having a first end and a second end distal to said first end, said conveyor sidewall actuator first end coupled to said conveyor sidewall and said conveyor sidewall actuator second end coupled to said undercarriage, said conveyor sidewall actuator configured to rotate said conveyor sidewall relative to said undercarriage about said conveyor sidewall axis of rotation away from said agricultural product within said tilting bin when starting said conveyor to thereby reduce a conveyor sidewall starting resistance and conveyor sidewall initial load.

14. The combination over-the-road vehicle and self unloading harvest cart of claim 13, wherein said conveyor sidewall further comprises first and second conveyor articulating sidewalls that each define a plane transverse to said conveyor sidewall axis of rotation; and wherein said first conveyor articulating sidewall is parallel with and immediately adjacent to said first bin sidewall and configured to prevent consequential escape of said agricultural product from within said tilting bin to an exterior thereof through any spacing therebetween, and said second conveyor articulating sidewall is parallel with and immediately adjacent to said third bin sidewall and configured to prevent consequential escape of said agricultural product from within said tilting bin to an exterior thereof through any spacing therebetween.

15. The combination over-the-road vehicle and self unloading harvest cart of claim 13, wherein each of said conveyor sidewall axis of rotation and said tilting bin axis of rotation are parallel with said fourth base edge.

16. The combination over-the-road vehicle and self unloading harvest cart of claim 15, wherein said conveyor sidewall generally defines a plane that is parallel to said conveyor sidewall axis of rotation.

17. The combination over-the-road vehicle and self unloading harvest cart of claim 13, wherein said conveyor sidewall further comprises a secondary conveyor that is coupled to said conveyor through a pintle, and has a secondary conveyor actuator configured to pivot said secondary conveyor relative to said conveyor about a secondary conveyor axis of rotation parallel to said conveyor sidewall axis of rotation.

18. The combination over-the-road vehicle and self unloading harvest cart of claim 13, wherein said first pivotal coupling and said second pivotal coupling each pivot about and thereby share a pin.

\* \* \* \* \*